(12) United States Patent
DeLuca (10) Patent No.: US 11,885,286 B2
(45) Date of Patent: Jan. 30, 2024

(54) SEPARATOR PLATE FOR COOLING TUBES (71) Applicant: Caterpillar Inc., Peoria, IL (US)

(72) Inventor: Anthony Loren DeLuca, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/301,630

(22) Filed: Apr. 9, 2021

(65) Prior Publication Data

US 2022/0325683 A1 Oct. 13, 2022

(51) Int. Cl.
F28F 9/22 (2006.01)
F02M 26/29 (2016.01)
F28F 9/013 (2006.01)

(52) U.S. Cl.
CPC ............. F02M 26/29 (2016.02); F28F 9/013 (2013.01); F28F 9/22 (2013.01); F28F 2009/222 (2013.01); F28F 2009/224 (2013.01)

(58) Field of Classification Search
CPC ...... F28D 7/16; F28D 7/1607; F28D 21/0003; F28F 9/22; F28F 2009/224
See application file for complete search history.

(56) References Cited

U.S. PATENT DOCUMENTS

| | | | | |
|---|---|---|---|---|
| 1,641,999 A | * | 9/1927 | Webster | F28F 9/22 |
| | | | | 122/DIG. 1 |
| 1,920,800 A | * | 8/1933 | McCausland | F28F 1/20 |
| | | | | 165/DIG. 405 |
| 2,185,928 A | * | 1/1940 | Crowley, Jr. | B01J 8/067 |
| | | | | 165/158 |
| 2,735,658 A | * | 2/1956 | Cook | F28F 9/0132 |
| | | | | 122/501 |
| 9,670,886 B2 | | 6/2017 | Yang et al. | |
| 9,933,216 B2 | | 4/2018 | Schatz et al. | |
| 2006/0144585 A1 | * | 7/2006 | Ha | F28F 1/06 |
| | | | | 126/307 R |
| 2009/0277606 A1 | | 11/2009 | Reiss, III et al. | |

FOREIGN PATENT DOCUMENTS

| | | | |
|---|---|---|---|
| GB | 1150032 A | * | 4/1969 |
| JP | 62112998 A | * | 5/1987 |
| WO | 2018/190450 A1 | | 10/2018 |

* cited by examiner

Primary Examiner — Eric S Ruppert
(74) Attorney, Agent, or Firm — Bookoff McAndrews, PLLC (57) ABSTRACT In some implementations, an exhaust gas recirculation cooler may include a shell defining an internal chamber; a first tube support plate defining a first wall of the internal chamber; a second tube support plate defining a second wall of the internal chamber; a plurality of cooling tubes extending through the internal chamber from the first tube support plate to the second tube support plate, the plurality of cooling tubes being flexible tubes; and at least one separator plate, extending within the internal chamber between the first tube support plate and the second tube support plate, that partitions the internal chamber such that a first set of the plurality of cooling tubes are to a first side of the at least one separator plate and a second set of the plurality of cooling tubes are to a second side of the at least one separator plate.

16 Claims, 5 Drawing Sheets

SEPARATOR PLATE FOR COOLING TUBES

TECHNICAL FIELD

The present disclosure relates generally to heat exchangers, such as exhaust gas recirculation (EGR) coolers, and, for example, to a separator plate for cooling tubes of a heat exchanger.

BACKGROUND

Internal combustion engine systems may emit certain undesirable air pollutants and particulates as a byproduct of the combustion process. For example, internal combustion engines may produce nitrous oxides (NOx) when combustion within the engine cylinders reaches elevated temperatures. In an effort to control these emissions, engine manufacturers have implemented various pollutant-reducing features, such as exhaust gas recirculation (EGR) systems.

EGR is a technique for reducing NOx emissions from internal combustion engines. In EGR systems, a portion of an engine's exhaust gas is recirculated back to the engine cylinders. The recirculation of the exhaust gas dilutes the oxygen in the incoming air stream and provides gas inert to combustion to act as absorbents of combustion heat to reduce peak in-cylinder temperatures. In many EGR systems, the recirculated exhaust gas is cooled by an EGR heat exchanger or cooler to allow the introduction of a greater mass of recirculated gas.

In some examples, an EGR cooler may include a shell and tube heat exchanger. Here, the EGR cooler may include a shell (e.g., a pressure vessel) with a bundle of tubes that extend lengthwise within the shell. Exhaust gas flows through the tubes, while a coolant (e.g., water) flows over the tubes, thereby transferring heat from the exhaust gas to the coolant. An EGR cooler may employ flexible tubes such as corrugated tubes (e.g., to minimize stress at connection points of the tubes). The flexibility of the tubes may permit the tubes to contact one another and/or contact the shell. For example, the tubes may flex due to machine and/or engine vibration loads of a machine that includes the EGR cooler. As another example, hot exhaust gas flowing through the tubes may cause thermal expansion of the tubes, thereby causing elongation of the tubes. In response to the elongation, the tubes may flex (or bow) within the shell (e.g., because ends of the tubes are fixed). This flexing of the tubes may result in undesirable contact between the tubes and/or between the tubes and the shell, which can increase wear of the tubes and/or the shell. The wear to the tubes and/or the shell may diminish a useful life of the tubes and/or the shell, lead to more frequent replacement of the tubes and/or the shell, cause the tubes and/or the shell to leak fluid, or the like.

U.S. Pat. No. 9,670,886 (the '886 patent) discloses an EGR cooler that includes an EGR valve housing in which a first chamber, connected to an exhaust manifold, and a second chamber, connected to an intake manifold, are formed. The '886 patent discloses a cooling core mounted on the EGR valve housing so as to allow the first and second chambers to be in communication with each other. The '886 patent discloses that the cooling core is manufactured by welding a first plate and a second plate, respectively, to both ends of linear tubes. The '886 patent discloses a separator extending from the center of the first plate to the center of the second plate so that the linear tubes are separated into upper linear tubes and lower linear tubes, and a tank fixed to the second plate and allowing the upper linear tubes and the lower linear tubes to be in communication with each other. While the EGR cooler of the '886 patent uses a separator to separate tubes into upper tubes and lower tubes, the '886 patent does not address wear to the tubes caused by flexing of the tubes (e.g., due to thermal expansion). Moreover, the '886 patent indicates that excessive stress is generated in connection parts between the linear tubes and the tank due to vibrations of the linear tubes, which would not occur if the linear tubes of the '886 patent were flexible.

The heat exchanger, EGR cooler, and/or EGR system of the present disclosure solve one or more of the problems set forth above and/or other problems in the art.

SUMMARY

In some implementations, an exhaust gas recirculation (EGR) cooler includes a shell defining an internal chamber; a first tube support plate defining a first wall of the internal chamber at a first end of the shell; a second tube support plate defining a second wall of the internal chamber, opposite the first wall, at a second end of the shell; a plurality of cooling tubes extending through the internal chamber from the first tube support plate to the second tube support plate, the plurality of cooling tubes being flexible tubes; and at least one separator plate, extending within the internal chamber between the first tube support plate and the second tube support plate, that partitions the internal chamber such that a first set of the plurality of cooling tubes are to a first side of the at least one separator plate and a second set of the plurality of cooling tubes are to a second side of the at least one separator plate, the at least one separator plate terminating short of the first tube support plate and short of the second tube support plate.

In some implementations, an EGR system includes an EGR passageway configured to recirculate exhaust gas exiting an engine to an intake of the engine; and an EGR cooler in the EGR passageway, the EGR cooler comprising: a shell defining an internal chamber; a first tube support plate defining a first wall of the internal chamber at a first end of the shell; a second tube support plate defining a second wall of the internal chamber, opposite the first wall, at a second end of the shell; a plurality of cooling tubes extending through the internal chamber from the first tube support plate to the second tube support plate, the plurality of cooling tubes being flexible tubes; and a plurality of separator plates extending within the internal chamber between the first tube support plate and the second tube support plate.

In some implementations, a heat exchanger includes a shell defining an internal chamber; a first tube support plate defining a first wall of the internal chamber at a first end of the shell; a second tube support plate defining a second wall of the internal chamber, opposite the first wall, at a second end of the shell; a plurality of cooling tubes extending through the internal chamber from the first tube support plate to the second tube support plate, the plurality of cooling tubes being flexible tubes; a coolant inlet in the shell between the first tube support plate and the second tube support plate; a coolant outlet in the shell between the first tube support plate and the second tube support plate; and at least one separator plate, within the internal chamber, that partitions the internal chamber such that a first set of the plurality of cooling tubes are to a first side of the at least one separator plate and a second set of the plurality of cooling tubes are to a second side of the at least one separator plate.

DETAILED DESCRIPTION

This disclosure relates to a heat exchanger, such as an exhaust gas recirculation (EGR) cooler, which is applicable to any machine that utilizes fluid cooling, such as a machine that utilizes an EGR system. For example, the machine may be a vehicle, a compactor machine, a paving machine, a cold planer, a grading machine, a backhoe loader, a wheel loader, a harvester, an excavator, a motor grader, a skid steer loader, a tractor, a dozer, or the like.

Figure 1:
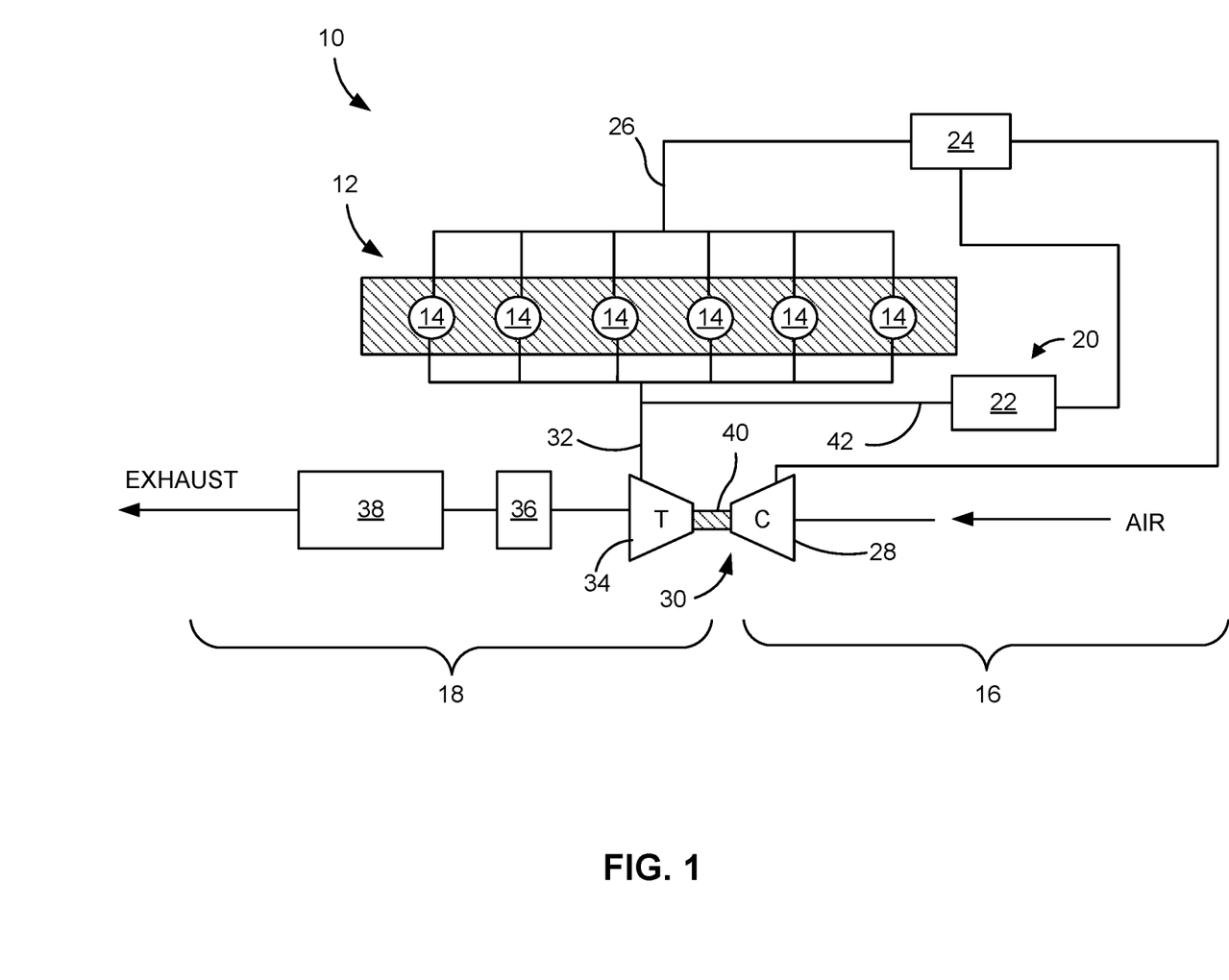
FIG. 1 is a diagram of an example exhaust gas recirculation (EGR) system described herein.

FIG. 1 is a diagram of an example power system 10 described herein. The power system 10 may be a compression ignition, internal combustion engine. However, the power system 10 may include any other type of internal combustion engine, such as, for example, a spark ignition engine. The power system 10 includes an engine 12 that includes an engine block with a plurality of cylinders 14 (engine 12 of FIG. 1 is shown with six cylinders 14). A piston assembly may be included within each of the cylinders 14 to form a combustion chamber within each cylinder 14. The engine 12 may include any number of combustion chambers and the combustion chambers may be disposed in an in-line configuration, a "V" configuration, or in any other suitable configuration.

The power system 10 may include multiple systems. For example, as shown in the example of FIG. 1, the power system 10 may include an air intake or air induction system 16, an exhaust system 18, and an EGR system 20. The air induction system 16 may be configured to direct air, or an air and fuel mixture (e.g., of air and another gas, such as exhaust gas) into the power system 10 for subsequent combustion. The exhaust system 18 may exhaust or release byproducts of the combustion, such as exhaust gas, to an atmosphere external to the power system 10. A recirculation loop of the EGR system 20 may be configured to direct a portion of the exhaust gas from the exhaust system 18 back into the air induction system 16 for subsequent combustion. The EGR system 20 may include an EGR cooler 22, as described below.

The air induction system 16 may include multiple components that coordinate to condition and introduce compressed air into the cylinders 14. For example, the air induction system 16 may include a mixer 24 and/or an intake manifold 26, located downstream of a compressor 28 of a turbocharger 30. The air induction system 16 feeds variable valve actuators (not shown) associated with respective ones of the cylinders 14. In some implementations, the air induction system 16 may include an air cooler, a filtering component, and/or a compressor bypass component, among other examples.

The exhaust system 18 may include multiple components that cooperate to condition and direct exhaust from the cylinders 14 to the atmosphere. For example, the exhaust system 18 may include an exhaust passageway 32, a turbine 34 driven by exhaust flowing through the exhaust passageway 32, a particulate collection device 36, such as a diesel particulate filter (DPF) located downstream of the turbine 34, and an exhaust aftertreatment device 38 (e.g., an aftertreatment selective catalytic reduction (SCR) component) fluidly connected downstream of the particulate collection device 36. The turbine 34 may be located to receive exhaust leaving the cylinders 14 and may be connected to the compressor 28 of the air induction system 16 by way of a turbocharger shaft 40 to form the turbocharger 30. As exhaust gas exiting the cylinders 14 flows through the turbine 34 and expands against vanes thereof, the turbine 34 may rotate and drive the compressor 28 to pressurize inlet air to the mixer 24.

The EGR system 20 may redirect gas from the exhaust system 18 back into the air induction system 16 for subsequent combustion. EGR is a process whereby exhaust gas from the engine 12 is recirculated back into the air induction system 16 for subsequent combustion. The recirculated exhaust gas may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of nitrous oxides (NOx). As mentioned above, the EGR system 20 may include an EGR cooler 22 to cool the exhaust gas before the gas is combusted.

When utilizing EGR, exhaust gas that is to be recirculated may be removed upstream of the exhaust gas-driven turbine 34 associated with the turbocharger 30. For example, in many EGR applications, a portion of the exhaust gas may be diverted from the exhaust passageway 32 to an EGR passageway 42 of the EGR system 20. The EGR passageway 42 may be configured to recirculate exhaust gas exiting the engine 12 to an intake of the engine 12 (e.g., intake manifold 26). The recirculated exhaust gas may be re-introduced to the air induction system 16 downstream of the compressor 28. In some implementations, the EGR system 20 may be an external EGR system and/or may include a system of primary control and/or bypass valves to allow an engine control module (ECM) to control various flows through the EGR system 20 during selected engine operating conditions.

As indicated above, FIG. 1 is provided as an example. Other examples may differ from what is described with regard to FIG. 1.

Figure 2:
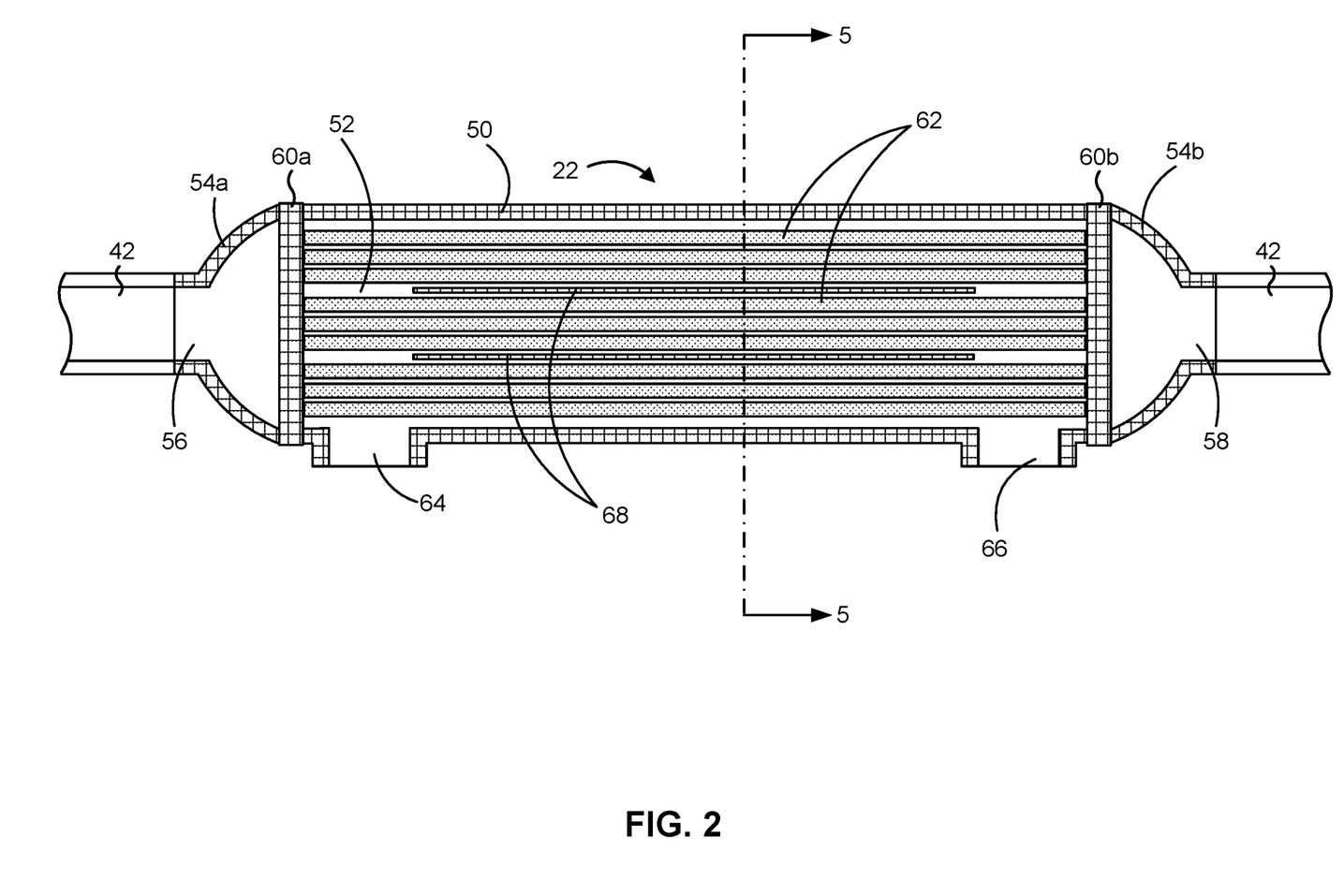
FIGS. 2-4 are cross-sectional views of an example EGR cooler described herein.

FIG. 2 is a cross-sectional view of an example EGR cooler 22 described herein. That is, FIG. 2 shows a heat exchanger that may be used in the EGR system 20. In some implementations, the heat exchanger may be used in connection with another system (e.g., in which a fluid is to be cooled).

As shown in FIG. 2, the EGR cooler 22 includes an elongate shell 50 that defines an internal chamber 52 of the EGR cooler 22. That is, the shell 50 provides a vessel for containing (e.g., in the internal chamber 52) a coolant of the EGR cooler 22. The shell may have a first end and a second end opposite the first end. The first end and the second end of the shell 50 may be open (e.g., the shell may be tubular). The shell 50 may be composed of a rigid material (e.g., steel). The shell 50 may have a cross-section that is circular, square, rectangular, or another shape. For example, the shell 50 may be cylindrical.

The EGR cooler 22 includes a first end cap 54a at the first end of the shell 50 and a second end cap 54b at the second end of the shell 50. The first end cap 54a may define a chamber for containing exhaust gas from the engine 12 (or another fluid that is to be cooled) prior to the exhaust gas passing through the internal chamber 52. The second end cap 54b may define a chamber for containing exhaust gas (e.g., cooled exhaust gas) after the exhaust gas passes through the internal chamber 52. The first end cap 54a includes an exhaust gas inlet 56 (or an inlet for another fluid that is to be cooled), for example, in axial alignment with the shell 50. The second end cap 54*b* includes an exhaust gas outlet 58 (or an outlet for another fluid that is to be cooled), for example, in axial alignment with the shell 50 (and/or in axial alignment with the exhaust gas inlet 56). The exhaust gas inlet 56 may connect with, or be otherwise in fluid communication with, an inlet side of the EGR passageway 42 of the EGR system 20. The exhaust gas outlet may connect with, or be otherwise in fluid communication with, an outlet side of the EGR passageway 42 of the EGR system 20. Thus, the EGR cooler 22 may be disposed in the EGR passageway 42 of the EGR system 20, and the EGR cooler 22 may interface with the EGR passageway 42 via the exhaust gas inlet 56 and the exhaust gas outlet 58.

The EGR cooler 22 includes a first tube support plate 60*a* at the first end of the shell 50 between the first end cap 54*a* and the shell 50. The EGR cooler 22 also includes a second tube support plate 60*b* at the second end of the shell 50 between the second end cap 54*b* and the shell 50. For example, the tube support plates 60 may interconnect the end caps 54 and the shell 50. In some implementations, connections between the end caps 54, the tube support plates 60, and the shell 50 may be welded connections, or the like.

The first tube support plate 60*a* defines a first wall of the internal chamber 52 at the first end of the shell 50, and the second tube support plate 60*b* defines a second wall of the internal chamber 52, opposite the first wall, at the second end of the shell. In other words, the shell 50 and the first and second tube support plates 60*a*, 60*b* define the internal chamber 52. A tube support plate 60 may include a plate (e.g., a circular plate for a cylindrical shell 50) that includes a plurality of apertures that receive, or otherwise interface with, a plurality of cooling tubes 62 (e.g., a tube bundle) of the EGR cooler 22.

For example, first ends of the plurality of cooling tubes 62 may respectively extend through, abut, or otherwise interface with, a plurality of apertures of the first tube support plate 60*a*, and second ends of the plurality of cooling tubes 62 may respectively extend through, abut, or otherwise interface with, a plurality of apertures of the second tube support plate 60*b*. Thus, the plurality of cooling tubes 62 extend (e.g., lengthwise) within the internal chamber 52 of the shell 50 from the first tube support plate 60*a* to the second tube support plate 60*b*. The plurality of cooling tubes 62 may occupy at least 80%, at least 85%, at least 90%, or at least 95% of a volume of the internal chamber 52. The amount of separation between the plurality of cooling tubes 62 that is shown is for illustration purposes; the plurality of cooling tubes 62 may have greater separation or lesser separation than what is shown.

The plurality of cooling tubes 62 may be linear tubes (e.g., elongate tubes that extend linearly within the internal chamber 52). For example, the plurality of cooling tubes 62 may be free of "U"-bends. The plurality of cooling tubes 62 may be flexible tubes (e.g., a cooling tube 62 may flex relative to an equilibrium position due to ordinary vibrations of a machine that includes the EGR cooler 22 and/or due to thermal expansion caused by exhaust gas flowing through the cooling tube 62); moreover, the plurality of cooling tubes 62 may be resilient (e.g., a cooling tube 62 may return to an equilibrium position after flexing). For example, the plurality of cooling tubes 62 may be corrugated tubes. In some examples, the plurality of cooling tubes 62 may flex during operation of a machine that includes the EGR cooler 22 (e.g., due to thermal expansion, which may promote contact between multiple cooling tubes 62 and/or contact between one or more cooling tubes 62 and the shell 50, as described above).

The EGR cooler 22 includes a coolant inlet 64 in the surface of the shell 50 in fluid communication with the internal chamber 52. The EGR cooler 22 also includes a coolant outlet 66 in the surface of the shell 50 in fluid communication with the internal chamber 52. The coolant inlet 64 and the coolant outlet 66 may be located in the shell 50 between the first tube support plate 60*a* and the second tube support plate 60*b* (e.g., to enable fluid communication of the coolant inlet 64 and the coolant outlet 66 with the internal chamber 52 of the shell 50). In some implementations, the coolant inlet 64 is located adjacent the first end of the shell 50, and the coolant outlet 66 is located adjacent the second end of the shell 50 (e.g., the coolant inlet 64 and the coolant outlet 66 are located at opposite ends of the shell 50 relative to a center line of the shell 50 that sections the shell 50 into a first half that includes the exhaust gas inlet 56 and a second half that include the exhaust gas outlet 58). For example, the coolant inlet 64 may be located adjacent to the first tube support plate 60*a*, and the coolant outlet 66 may be located adjacent to the second tube support plate 60*b*.

The coolant inlet 64 is configured to allow a coolant (e.g., a cooling fluid, such as water, air, or the like, that has a relatively lower temperature than the fluid that is to be cooled) to enter the internal chamber 52, and the coolant outlet 66 is configured to allow the coolant to exit the internal chamber 52. Coolant may be supplied to the internal chamber 52 using a coolant supply system (not shown) of the EGR system 20. For example, the coolant supply system may include one or more coolant reservoirs, one or more pumps, one or more coolant passageways, one or more control valves, and/or one or more heat dissipators, among other examples.

In some implementations, the EGR cooler 22 may have a single-pass configuration. In some examples, in the single pass configuration, exhaust gas (or another fluid that is to be cooled) entering the EGR cooler 22 passes through the internal chamber 52 only one time before exiting the EGR cooler 22. In some examples, in the single-pass configuration, exhaust gas (or another fluid that is to be cooled) passes through the internal chamber 52 in only one direction (e.g., a direction from the first tube support plate 60*a* to the second tube support plate 60*b*, and not in an opposite direction from the second tube support plate 60*b* to the first tube support plate 60*a*).

In the single-pass configuration, exhaust gas entering the first end cap 54*a* may flow into any of the plurality of cooling tubes 62 (e.g., the first end cap 54*a* is not partitioned such that the exhaust gas can flow only into a particular subset of the plurality of cooling tubes 62). Moreover, in the single-pass configuration, the coolant inlet 64 and the coolant outlet 66 may be located adjacent opposite ends of the shell 50 (e.g., opposite ends relative to a center line of the shell 50 that sections the shell 50 into a first half that includes the exhaust gas inlet 56 and a second half that include the exhaust gas outlet 58), as described above. For example, the coolant inlet 64 and the coolant outlet 66 are not located at the same end of the shell 50, such as in a two-pass configuration where exhaust gas has a first pass in the direction from the first tube support plate 60*a* to the second tube support plate 60*b*, and a second pass in the opposite direction from the second tube support plate 60*b* to the first tube support plate 60*a*. Additionally, in the single-pass configuration, the plurality of cooling tubes 62 may be linear (e.g., free of a "U"-bend), as described above. For example, exhaust gas may flow through the plurality of cooling tubes 62 without a change in direction.

The EGR cooler 22 includes at least one separator plate 68. For example, the EGR cooler 22 may include a plurality (e.g., one or more) of separator plates 68. A separator plate 68 may be composed of a rigid material (e.g., steel). A separator plate 68 may include a rectangular plate. A separator plate 68 may partition the internal chamber 52 into multiple sub-chambers (e.g., multiple sub-chambers in fluid communication with each other), and each sub-chamber may contain a sub-set of the plurality of cooling tubes 62 (e.g., a sub-bundle of the tube bundle). For example, the separator plate 68 may partition a first set of the plurality of cooling tubes 62 to a first side of the separator plate 68 (e.g., in a first sub-chamber of the internal chamber 52) and a second set of the plurality of cooling tubes 62 to a second side of the separator plate 68 (e.g., in a second sub-chamber of the internal chamber 52), such that the separator plate 68 is between the first set and the second set of the plurality of cooling tubes 62. The location and/or arrangement of the separator plate(s) 68 may limit flexing or other movement of the plurality of cooling tubes 62 within the shell 50.

As indicated above, FIG. 2 is provided as an example. Other examples may differ from what is described with regard to FIG. 2.

Figure 3:
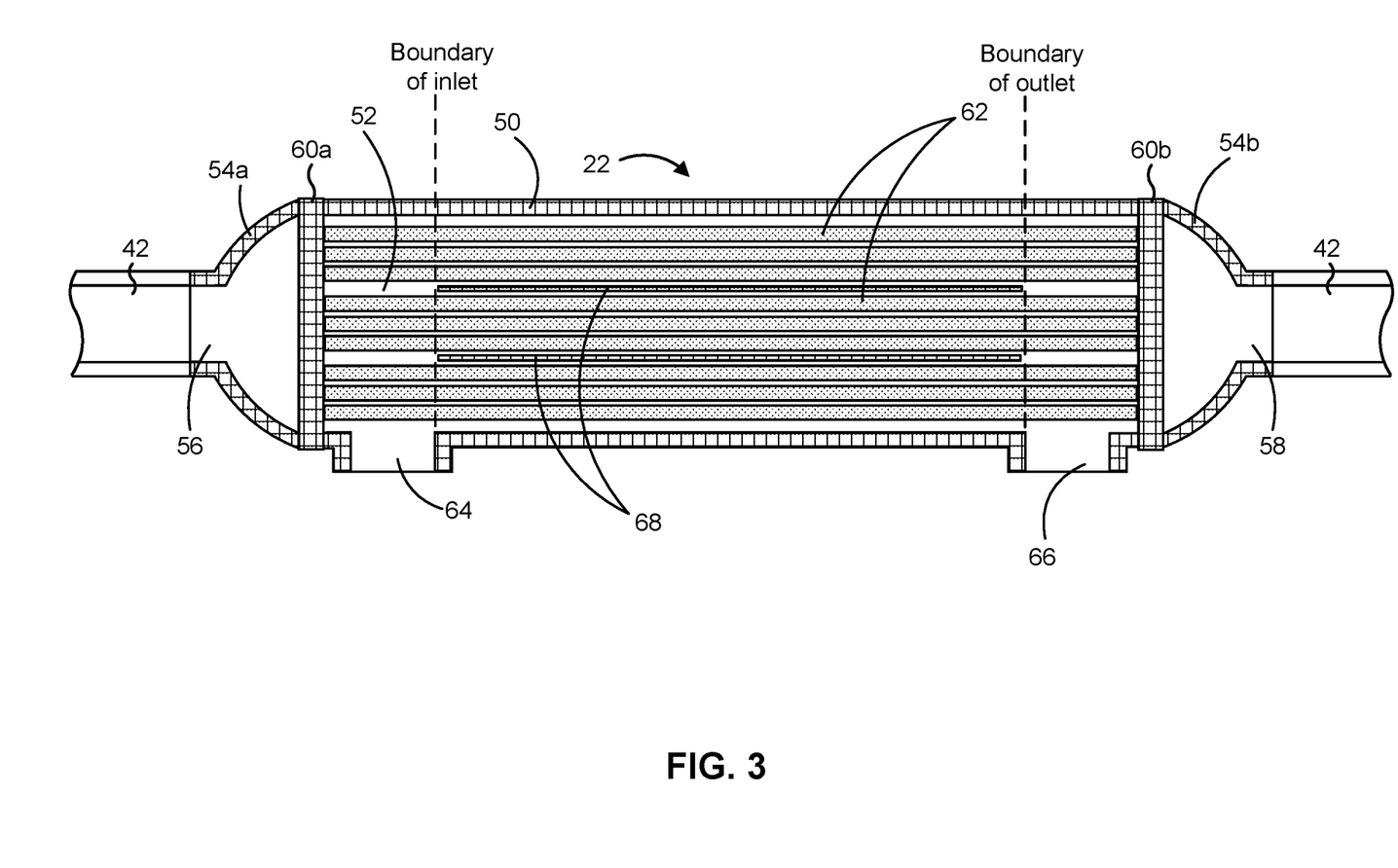

FIG. 3 is a cross-sectional view of the example EGR cooler 22 described herein. As shown in FIG. 3, a separator plate 68 may extend within the internal chamber 52 of the shell 50 between the first tube support plate 60a and the second tube support plate 60b. That is, the separator plate 68 may extend within the internal chamber 52 in the same direction as (e.g., parallel to) the plurality of cooling tubes 62. The separator plate 68 may terminate short of the first tube support plate 60a and short of the second tube support plate 60b (and therefore, short of the first end cap 54a and short of the second end cap 54b). In other words, the separator plate 68 may be shaped and positioned to provide a first gap between the separator plate 68 and the first tube support plate 60a (e.g., the separator plate 68 does not contact the first tube support plate 60a) and a second gap between the separator plate 68 and the second tube support plate 60b (e.g., the separator plate 68 does not contact the second tube support plate 60b).

In some implementations, the separator plate 68 may extend within the internal chamber 52 of the shell 50 between the coolant inlet 64 and the coolant outlet 66. For example, the separator plate 68 may terminate short of the coolant inlet 64 and short of the coolant outlet 66. Here, the separator plate 68 terminates short of the coolant inlet 64 when an edge of the separator plate 68 (e.g., an edge nearest to the first tube support plate 60a) terminates at, or short of, a boundary plane (as shown) that is perpendicular to the shell 50 and intersects a proximal edge of the coolant inlet 64. Similarly, the separator plate 68 terminates short of the coolant outlet 66 when an edge of the separator plate 68 (e.g., an edge nearest to the second tube support plate 60b) terminates at, or short of, a boundary plane (as shown) that is perpendicular to the shell 50 and intersects a proximal edge of the coolant outlet 66.

As indicated above, FIG. 3 is provided as an example. Other examples may differ from what is described with regard to FIG. 3.

Figure 4:
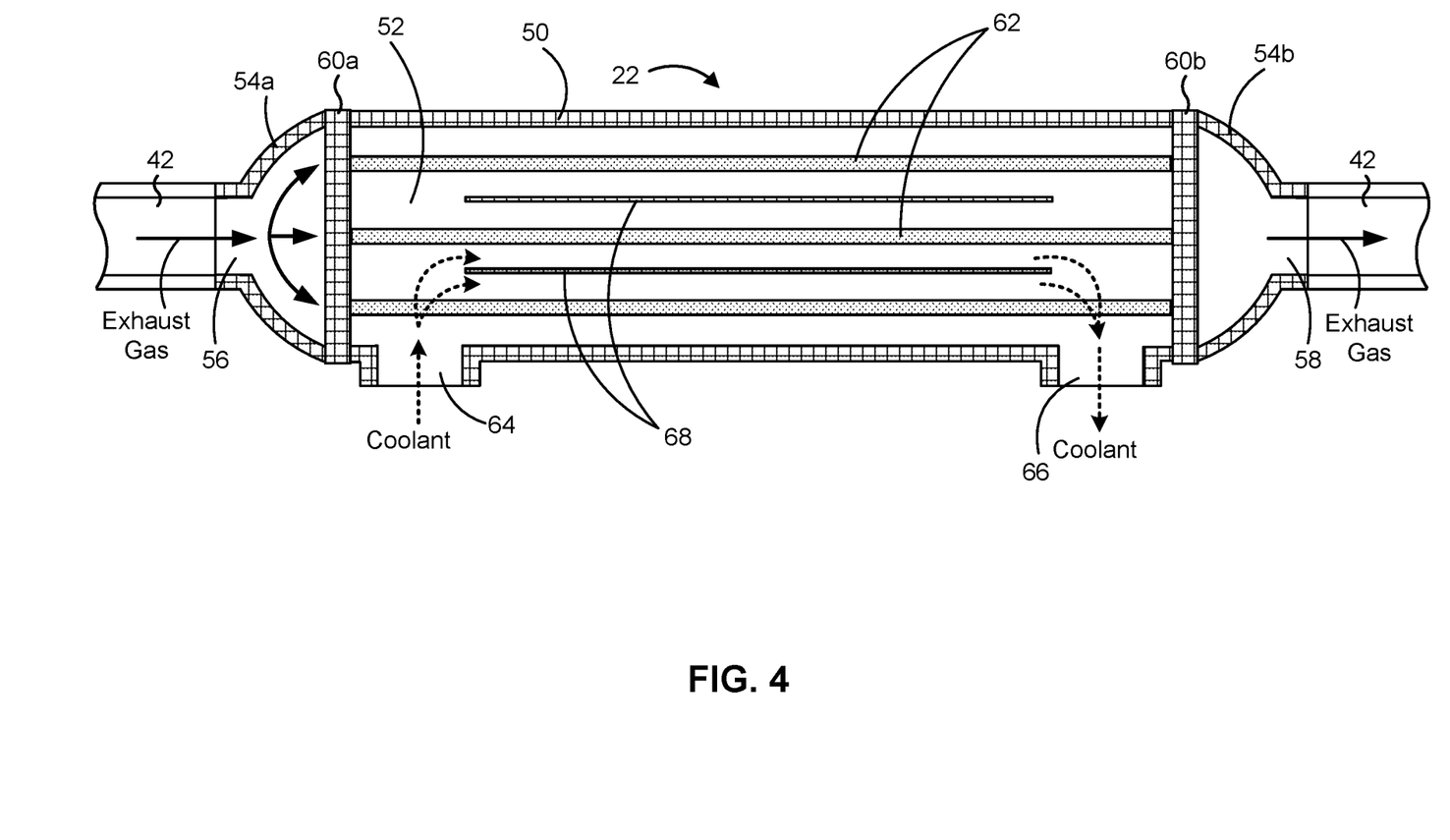

FIG. 4 is a cross-sectional view of the example EGR cooler 22 described herein. While FIG. 4 shows greater separation between the cooling tubes 62 relative to FIGS. 2 and 3 for illustration purposes, the amount of separation between the cooling tubes 62 may be as described above in connection with FIG. 2.

As shown in FIG. 4, interiors of the plurality of cooling tubes 62 are in fluid communication with the first end cap 54a and the exhaust gas inlet 56 via the first tube support plate 60a, and the interiors of the plurality of cooling tubes 62 are in fluid communication with the second end cap 54b and the exhaust gas outlet 58 via the second tube support plate 60b. Accordingly, as shown in FIG. 4, exhaust gas (or another fluid that is to be cooled) may enter the EGR cooler 22 via the exhaust gas inlet 56, flow through the plurality of cooling tubes 62, and exit the EGR cooler 22 via the exhaust gas outlet 58. Moreover, the EGR cooler 22 may be configured such that exhaust gas only flows through the plurality of cooling tubes 62 in a single direction from the first tube support plate 60a to the second tube support plate 60b (e.g., the EGR cooler has a single-pass configuration, as described above).

As shown in FIG. 4, the EGR cooler 22 may be configured such that coolant entering the internal chamber 52 of the shell 50 via the coolant inlet 64 flows over the plurality of cooling tubes 62 (e.g., to cause heat exchange) through the internal chamber 52, and exits the internal chamber 52 via the coolant outlet 66. Thus, the coolant inlet 64 and the coolant outlet 66 may be in fluid communication via the internal chamber 52.

In some implementations, as shown in FIG. 4, the coolant inlet 64 and the coolant outlet 66 are in fluid communication via both of a first side and a second side of a separator plate 68 (e.g., a separator plate 68 that partitions a first set of the plurality of cooling tubes 62 to the first side and a second set of the plurality of cooling tubes 62 to the second side). In other words, coolant that enters the internal chamber 52 is not trapped to one side of the separator plate 68, and may take a first coolant flow path to the first side of the separator plate 68 and a second coolant flow path to the second side of the separator plate 68 in order to reach the coolant outlet 66 (e.g., which is enabled because the separator plate 68 terminates short of the first tube support plate 60a and short of the second tube support plate 60b, as described above). The first coolant flow path and the second coolant flow path may run in the same direction (e.g., a direction from the first tube support plate 60a to the second tube support plate 60b) in accordance with a single-pass configuration of the EGR cooler 22. In some implementations, the separator plate 68 may contact the first tube support plate 60a and the second tube support plate 60b, and the separator plate 68 may include one or more apertures to provide fluid communication between the coolant inlet 64 and the coolant outlet 66 via the first and second sides of the separator plate 68.

As indicated above, FIG. 4 is provided as an example. Other examples may differ from what is described with regard to FIG. 4.

Figure 5:
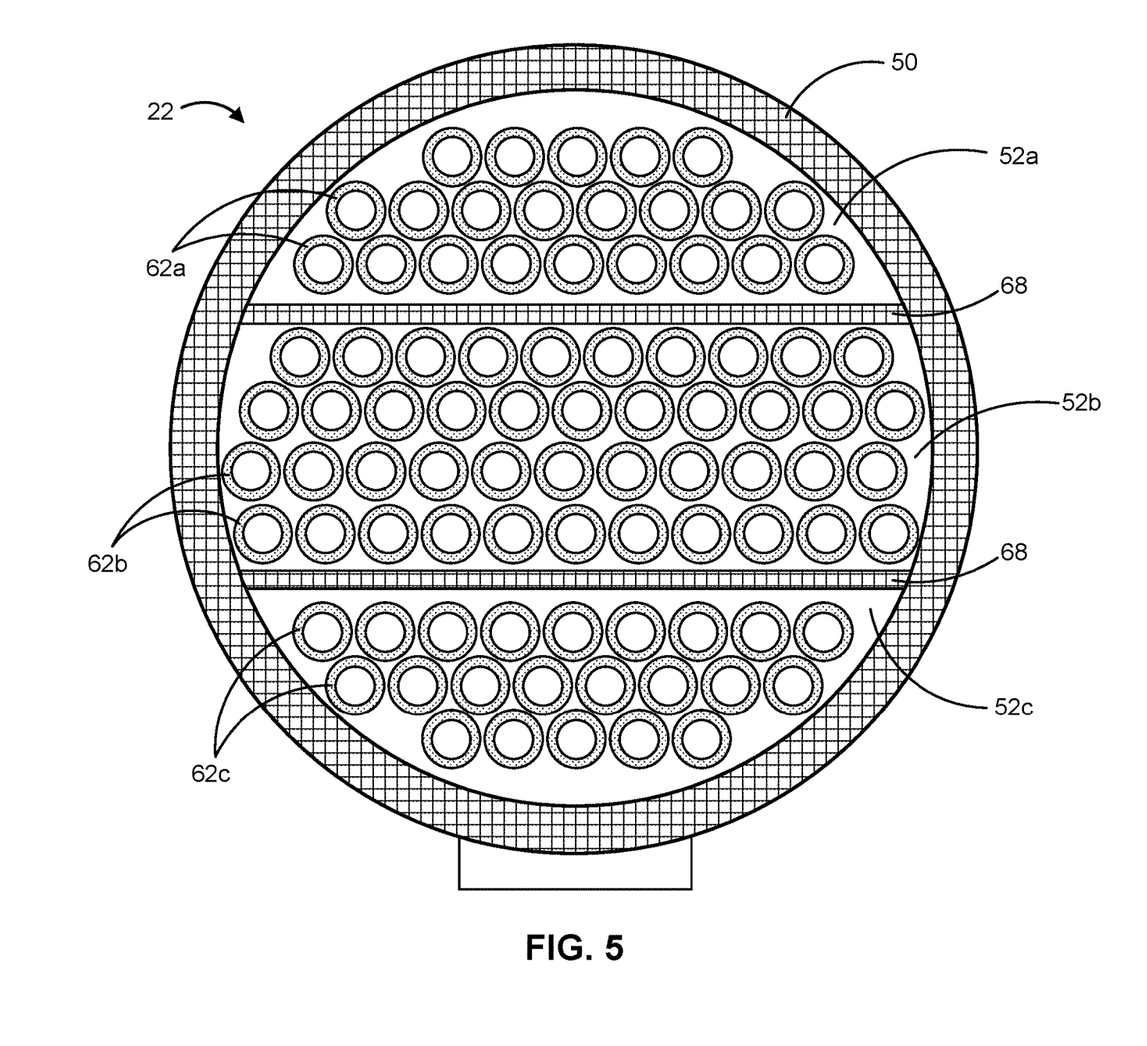
FIG. 5 is a cross-sectional view of the example EGR cooler described herein taken generally along line 5-5 in FIG. 2.

FIG. 5 is a cross-sectional view of the example EGR cooler 22 described herein taken generally along line 5-5 in FIG. 2. As shown in FIG. 5, the plurality of separator plates 68 may partition the internal chamber 52 into multiple sub-chambers 52a, 52b, and 52c, and partition the plurality of cooling tubes 62 into multiple partitioned sets 62a, 62b, and 62c of the plurality of cooling tubes 62 (e.g., three partitioned sets as shown in FIG. 5), as described above. Each partitioned set 62a, 62b, and 62c of the plurality of cooling tubes 62 may be contained in a respective sub-chamber 52a, 52b, and 52c of the internal chamber 52. Each partitioned set 62a, 62b, and 62c of the plurality of cooling tubes 62 may include an equal (or approximately equal, such as ±10%) quantity of cooling tubes 62.

The plurality of separator plates 68 may include one or more separator plates 68 that extend, within the internal chamber 52 of the shell 50, vertically, horizontally, diagonally, or a combination thereof (e.g., relative to an orientation of the EGR cooler 22 in which the coolant inlet 64 is located in the bottom of the shell 50, as shown in FIGS. 2-4). The plurality of separator plates 68 may include a first separator plate 68 and a second separator plate 68. In some examples, the first separator plate 68 is parallel to the second separator plate 68. In some examples, the first separator plate 68 is orthogonal to the second separator plate 68. The plurality of separator plates 68 may include a combination of parallel separator plates 68 and orthogonal separator plates 68.

A separator plate 68 may extend across the internal chamber 52 such that opposite edges of the separator plate 68 respectively contact the shell 50. The edges of the separator plate 68 may be connected to the shell 50 by welds, adhesives, fasteners, or the like.

As indicated above, FIG. 5 is provided as an example. Other examples may differ from what is described with regard to FIG. 5.

INDUSTRIAL APPLICABILITY

The exhaust gas recirculation (EGR) cooler 22 (or heat exchanger) described herein may be used in any machine that includes an internal combustion engine. For example, the EGR cooler 22 may be used in a machine that includes the EGR system 20. The EGR cooler 22 may be used to lower a temperature of exhaust gas exiting the engine 12 before the exhaust gas is recirculated to the engine 12 for subsequent combustion. As described above, EGR that uses the EGR cooler 22 may reduce air pollutants, such as nitrous oxides (NOx), resulting from fuel combustion in the engine 12.

As described above, the EGR cooler 22 may include cooling tubes 62 (e.g., which may be flexible tubes, such as corrugated tubes) within the shell 50. In some cases, the cooling tubes 62 may vibrate or flex within the shell 50 during operation of a machine that includes the EGR cooler 22. Moreover, due to thermal expansion of the cooling tubes 62 when exhaust gas is introduced to interiors of the cooling tubes 62, the cooling tubes 62 may flex or otherwise move within the shell 50. The flexing or other movement of the cooling tubes 62 within the shell 50 may cause the cooling tubes 62 to contact each other and/or contact the shell, thereby wearing or damaging the cooling tubes 62 and/or the shell 50. This may reduce a useful life of the cooling tubes 62 and/or the shell 50, lead to more frequent replacement of the cooling tubes 62 and/or the shell 50, cause the cooling tubes 62 and/or the shell 50 to leak fluid, or the like. The wear or damage may be exacerbated when the cooling tubes 62 flex or move in unison due to the combined mass of the cooling tubes 62.

The separator plate 68 described herein provides partitioning of a bundle of cooling tubes 62 into multiple sub-bundles. That is, the separator plate 68 may partition an internal chamber 52 of the shell into multiple sub-chambers, and each sub-chamber may contain a respective sub-bundle of the cooling tubes 62. The separator plate 68 may restrict vibration, flexing, or other movement of the cooling tubes 62 within the shell 50 (e.g., by confining sub-bundles of cooling tubes 62 to relatively smaller areas). For example, the separator plate 68 may prevent the entire bundle of cooling tubes 62 from flexing or moving in unison, as described above. Moreover, a sub-bundle of cooling tubes 62 has a lesser mass than the entire bundle of cooling tubes 62, thereby reducing wear or damage to the cooling tubes 62 and/or the shell 50 that may otherwise occur when multiple cooling tubes 62 flex or move in unison. As a result, wear and damage to the cooling tubes 62 and/or the shell 50 is reduced, thereby prolonging a useful life of the EGR cooler 22, extending a time duration between replacement of the cooling tubes 62 and/or the shell 50, reducing leaks in the cooling tubes 62 and/or the shell 50, or the like.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. An exhaust gas recirculation (EGR) cooler comprising:
a shell extending along a longitudinal direction and defining an internal chamber therein;
a first tube support plate defining a first wall of the internal chamber at a first end of the shell;
a second tube support plate defining a second wall of the internal chamber, opposite the first wall, at a second end of the shell;
a plurality of cooling tubes extending through the internal chamber from the first tube support plate to the second tube support plate along the longitudinal direction, the plurality of cooling tubes being flexible tubes;
a coolant inlet through the shell;
a coolant outlet through the shell, the coolant inlet being disposed between the coolant outlet and the first tube support plate along the longitudinal direction, the coolant outlet being disposed between the coolant inlet and the second tube support plate along the longitudinal direction; and
a substantially planar separator plate, extending within the internal chamber between the first tube support plate and the second tube support plate along the longitudinal direction, that partitions the internal chamber such that a first set of cooling tubes of the plurality of cooling tubes is disposed on a first side of the separator plate, and a second set of the plurality of cooling tubes of the plurality of cooling tubes is disposed on a second side of the separator plate,
the separator plate extending within the internal chamber between the coolant inlet and the coolant outlet along the longitudinal direction, and the separator plate terminating short of the coolant inlet and short of the coolant outlet, a first end of the separator plate being disposed adjacent to the coolant inlet, and a second end of the separator plate being disposed adjacent to the coolant outlet, the first end of the separator plate being opposite the second end of the separator plate along the longitudinal direction.

2. The EGR cooler of claim 1, wherein the EGR cooler has a single-pass configuration.

3. The EGR cooler of claim 1, further comprising:
an exhaust gas inlet in fluid communication with interiors of the plurality of cooling tubes via the first tube support plate; and
an exhaust gas outlet in fluid communication with the interiors of the plurality of cooling tubes via the second tube support plate.

4. The EGR cooler of claim 1, wherein the coolant inlet and the coolant outlet are in fluid communication via both the first side of the separator plate and the second side of the separator plate.

5. The EGR cooler of claim 1, wherein each cooling tube of the plurality of cooling tubes is a corrugated tube.

6. The EGR cooler of claim 1, further comprising a plurality of separator plates extending within the internal chamber between the first tube support plate and the second tube support plate along the longitudinal direction, the plurality of separator plates including the separator plate.

7. The EGR cooler of claim 1, wherein the separator plate is directly connected to the shell.

8. An exhaust gas recirculation (EGR) system comprising:
an EGR passageway configured to recirculate exhaust gas exiting an engine to an intake of the engine; and
an EGR cooler in the EGR passageway, the EGR cooler comprising:
a shell extending along a longitudinal direction and defining an internal chamber therein;
a first tube supporting plate defining a first wall of the internal chamber at a first end of the shell;
a second tube support plate defining a second wall of the internal chamber, opposite the first all along the longitudinal direction, at a second end of the shell;
a coolant inlet through the shell between the first tube support plate and the second tube support plate;
a coolant outlet through the shell between the first tube support plate and the second tube support plate;
a plurality of cooling tubes extending through the internal chamber from the first tube support plate to the second tube support plate, the plurality of cooling tubes being flexible tubes; and
a plurality of separator plates extending within the internal chamber along the longitudinal direction between the coolant inlet and the coolant outlet, each plate terminating short of the coolant inlet and coolant outlet, adjacent separator plates of the plurality of separator plates facing one another along a first transverse direction, the first transverse direction being transverse to the longitudinal direction,
the plurality of cooling tubes being arranged in a plurality of tube rows distributed along the first transverse direction,
at least, two tube rows of the plurality of tube rows being disposed between adjacent separator plates of the plurality of separator plates along the first transverse direction, wherein adjacent separator plates have no additional separator plates disposed therebetween.

9. The EGR system of claim 8, wherein each cooling tube of the plurality of cooling tubes is a corrugated tube.

10. The EGR system of claim 8, wherein the plurality of separator plates includes a first separator plate and a second separator plate, and wherein the first separator plate is parallel to the second separator plate.

11. The EGR system of claim 8, wherein each separator plate of the plurality of separator plates is directly connected to the shell.

12. A heat exchanger, comprising:
a shell extending along a longitudinal direction and defining an internal chamber therein;
a first tube support plate defining a first wall of the internal chamber at a first end of the shell;
a second tube support plate defining a second wall of the internal chamber, opposite the first wall, at a second end of the shell;
a plurality of cooling tubes extending through the internal chamber from the first tube support plate to the second tube support plate along the longitudinal direction, the plurality of cooling tubes being flexible tubes;
a coolant inlet through the shell between the first tube support plate and the second tube support plate, the coolant inlet being disposed adjacent to the first tube support plate;
a coolant outlet through the shell between the first tube support plate and the second tube support plate, the coolant outlet being disposed adjacent to the second tube support plate; and
a substantially planar separator plate, within the internal chamber, that partitions the internal chamber such that a first set of cooling tubes of the plurality of cooling tubes is disposed on a first side of the separator plate, and a second set of cooling tubes of the plurality of cooling tubes is disposed on a second side of the separator plate,
the separator plate extending within the internal chamber between the coolant inlet and the coolant outlet along the longitudinal direction, and the separator plate terminating short of the coolant inlet and short of the coolant outlet,
a first end of the separator plate being disposed adjacent to the coolant inlet, and a second end of the separator plate being disposed adjacent to the coolant outlet, the first end of the separator plate being opposite the second end of the separator plate along the longitudinal direction.

13. The heat exchanger of claim 12, wherein each tube of the plurality of cooling tubes is a corrugated tube.

14. The heat exchanger of claim 12, wherein the separator plate extends within the internal chamber between the first tube support plate and the second tube support plate along the longitudinal direction, and the separator plate terminates short of the first tube support plate and short of the second tube support plate.

15. The heat exchanger of claim 12, further comprising a plurality of separator plates disposed within the internal chamber, the plurality of separator plates including the separator plate.

16. The heat exchanger of claim 12, wherein the separator plate is directly connected to the shell.

* * * * *